(12) United States Patent
Van Baren et al.

(10) Patent No.: US 11,831,942 B2
(45) Date of Patent: Nov. 28, 2023

(54) AUDIO AND VISUAL DIGITAL MEDIA SYSTEM

(71) Applicant: Muzak LLC, Austin, TX (US)

(72) Inventors: Morgan Jean Rene Van Baren, Austin, TX (US); Gordon Howard Courtney, Austin, TX (US)

(73) Assignee: Muzak LLC, Austin, TX (US)

( * ) Notice: Subject to any disclaimer, the term of this patent is extended or adjusted under 35 U.S.C. 154(b) by 0 days.

(21) Appl. No.: 17/039,457

(22) Filed: Sep. 30, 2020

(65) Prior Publication Data
US 2021/0099750 A1    Apr. 1, 2021

Related U.S. Application Data

(60) Provisional application No. 62/908,291, filed on Sep. 30, 2019.

(51) Int. Cl.
*H04N 21/43*    (2011.01)
*H04N 21/472*   (2011.01)
(Continued)

(52) U.S. Cl.
CPC ..... *H04N 21/4307* (2013.01); *H04N 21/2187* (2013.01); *H04N 21/4622* (2013.01); *H04N 21/47202* (2013.01)

(58) Field of Classification Search
CPC ........... H04N 21/4307; H04N 21/4622; H04N 21/47202; H04N 21/2187; H04N 21/20; H04N 21/21; H04N 21/2143; H04N 21/218; H04N 21/21815; H04N 21/2183; H04N 21/2221; H04N 21/2225; H04N 21/23109;
(Continued)

(56) References Cited

U.S. PATENT DOCUMENTS

2003/0020744 A1 * 1/2003 Ellis ................... H04N 5/44543
715/723
2003/0110513 A1    6/2003 Plourde, Jr. et al.
(Continued)

OTHER PUBLICATIONS

Patent Cooperation Treaty Office; International Search Report and Written Opinion cited in PCT/US20/53595 dated Dec. 22, 2020; 10 pages.
(Continued)

*Primary Examiner* — Nnenna N Ekpo
(74) *Attorney, Agent, or Firm* — Sterne, Kessler, Goldstein & Fox P.L.L.C.

(57) ABSTRACT

The present technology allows for the management and output of audio and visual media at one or more locations, including the direction and display of static and/or dynamic signage, prerecorded and/or live video content, and audio content from one or more output devices, such as various screens, projectors, or display units, including customized direction of such content to multiple screens or display units at multiple locations. It is thereby possible to customize sights and sound for a desired theme or brand and choose from multiple, customizable content options. In this way, one can manage and schedule digital signage solutions across one or more locations using a single management device. Present operation and operation history of one or more media players can be monitored using the management device.

20 Claims, 10 Drawing Sheets

(51) Int. Cl.
H04N 21/462 (2011.01)
H04N 21/2187 (2011.01)

(58) Field of Classification Search
CPC ............... H04N 21/232; H04N 21/233; H04N 21/2387; H04N 21/24; H04N 21/2401; H04N 21/2407; H04N 21/2408; H04N 21/2665; H04N 21/2747; H04N 21/40; H04N 21/41265; H04N 21/42204; H04N 21/44204; H04N 21/44213; H04N 21/44224; H04N 21/47205; H04N 21/47217; H04N 21/6125; H04N 21/6581; H04N 21/6582
See application file for complete search history.

(56) References Cited

U.S. PATENT DOCUMENTS

| | | |
|---|---|---|
| 2005/0033657 A1 | 2/2005 | Derrington et al. |
| 2007/0089057 A1 | 4/2007 | Kindig |
| 2007/0157249 A1* | 7/2007 | Cordray ........... H04N 21/44222 |
| | | 725/58 |
| 2008/0183840 A1 | 7/2008 | Khedouri |
| 2009/0172724 A1* | 7/2009 | Ergen .................... H04H 20/106 |
| | | 348/E7.001 |
| 2009/0222864 A1 | 9/2009 | Drakoulis et al. |
| 2010/0180311 A1* | 7/2010 | Gordon ............. G06Q 30/0256 |
| | | 705/14.54 |
| 2013/0226962 A1 | 8/2013 | Riggs et al. |
| 2014/0222438 A1 | 8/2014 | Courtney, III et al. |
| 2017/0084293 A1 | 3/2017 | Holzer et al. |
| 2018/0129962 A1* | 5/2018 | Mathew ............... G06Q 10/101 |

OTHER PUBLICATIONS

Zhao et al. "Earpod: eyes-free menu selection using touch input and reactive audio feedback." In: Proceedings of the SIGCHI conference on Human factors in computing systems. May 3, 2007 (May 3, 2007) Retrieved on Nov. 24, 2020 (Nov. 24, 2020) from <http://w.patrickbaudisch.com/publications/2007-Zhao-CHI07-EarPod.pdf> entire document.

* cited by examiner

AUDIO AND VISUAL DIGITAL MEDIA SYSTEM

CROSS-REFERENCE TO RELATED APPLICATIONS

This application is a non-provisional application tracing priority and claiming benefit to U.S. Provisional Application No. 62/908,291, filed Sep. 30, 2019, entitled "AUDIO AND VISUAL DIGITAL MEDIA SYSTEM", the entirety of which is expressly incorporated herein by reference.

FIELD

The present technology relates to management and output of audio and visual media at one or more locations, including the direction and display of static and/or dynamic signage, prerecorded and/or live video content, and audio content from one or more output devices, such as various screens, projectors, or display units, including customized direction of such content to multiple screens or display units at multiple locations.

INTRODUCTION

This section provides background information related to the present disclosure which is not necessarily prior art.

Certain residential and commercial environments include one or more output devices for visual content, such as various screens, projectors, or display units, as well as one or more devices for audio content, such as speakers, surround sound systems, or public address systems. It is desirable to select and control audio and visual content provided throughout a particular environment as well as at various remote locations. For example, audio and visual content can be curated for a particular room or rooms throughout a dwelling or business. Where a business has multiple locations, a common theme of audio and visual content can be provided thereto or each location can have a personalized or tailored selection of audio and visual content. It would be advantageous to centrally modify, update, and/or critique available audio and visual content that is provided at various locations. For example, a restaurant chain may desire to display an updated menu or daily specials in association with the display of a live sporting event or other program, whereas audio content can be changed based upon the time of day, nature of an event, or in relation to visual content being provided.

SUMMARY

The present technology includes articles of manufacture, systems, and processes that relate to selecting, managing, and outputting audio and visual content.

Ways of operating and constructing audio and visual digital media systems are provided that include a management device, a media player, and an output device. The management device is configured with a content database, where the content database includes identities of audio and visual content. The management device is further configured to select amongst the identities of audio and visual content from the content database to provide audio and visual selections. Non-limiting examples of the management device include an application or software running on a computer or mobile electronic device, as well as a dedicated electronic device. The media player is configured for receiving from the management device the audio and visual selections. The media player is also configured for retrieving data corresponding to the audio and visual selections. Non-limiting examples of the media player include electronic devices having various processing, non-transient data storage, and communication means, where the communication means receives from the management device the audio and visual selections and the non-transient data storage means includes the retrieved data corresponding to the audio and visual selections. The output device is configured for outputting the retrieved data corresponding to the audio and visual selections. Non-limiting examples of the output device include various screens, projectors, or display units such as smart televisions, as well as one or more separate or integrated devices for playing audio content, such as speakers, surround sound systems, headphones, earbuds, or public address systems. Such systems can include recording, tracking, and reporting functionalities that can report information to the management device. Feedback functionality can also be included with the media player and/or output device to tag or modify audio and visual selections.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
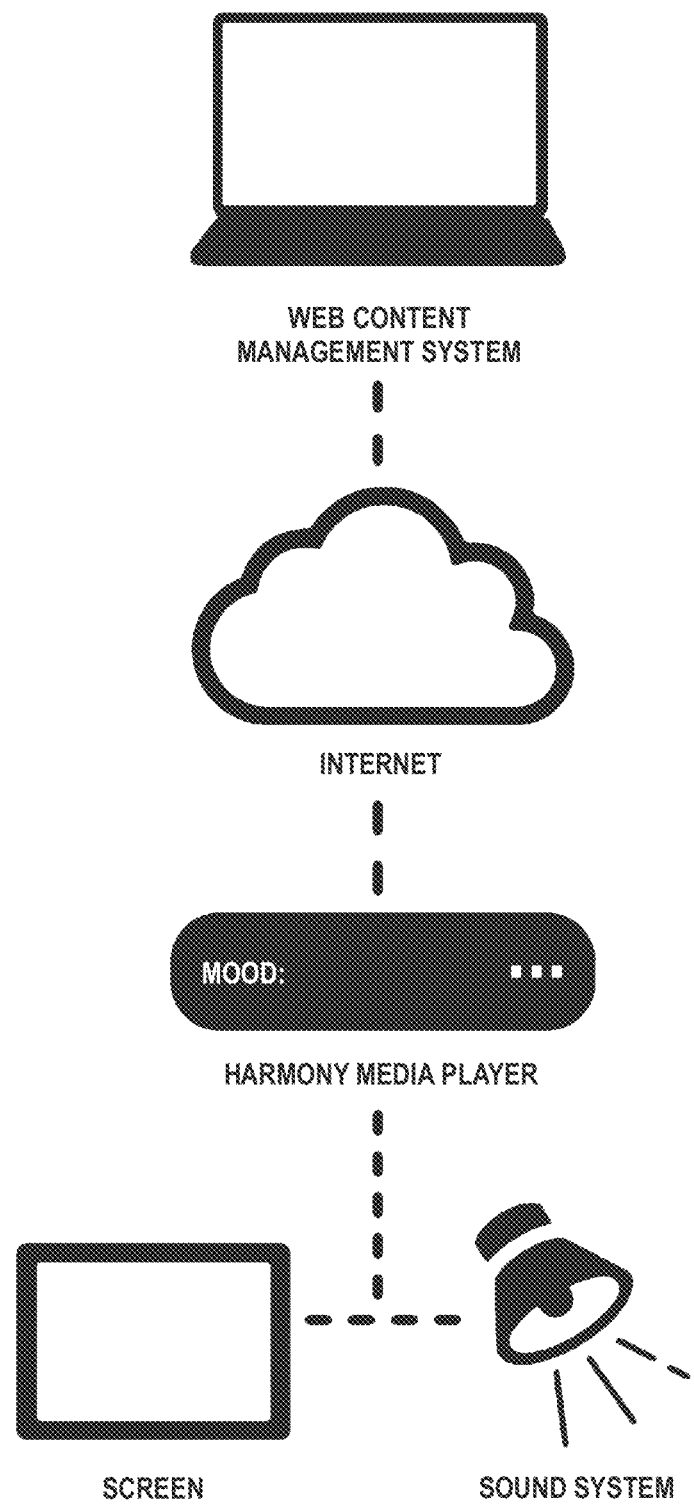
FIG. 1 shows a schematic representation of an audio and visual digital media system according to the present technology.

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

All documents, including patents, patent applications, and scientific literature cited in this detailed description are incorporated herein by reference, unless otherwise expressly indicated. Where any conflict or ambiguity may exist between a document incorporated by reference and this detailed description, the present detailed description controls.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The present technology allows for the management and output of audio and visual media at one or more locations, including the direction and display of static and/or dynamic signage, prerecorded and/or live video content, and audio content from one or more output devices, such as various screens, projectors, or display units, including customized direction of such content to multiple screens or display units at multiple locations. It is thereby possible to customize sights and sound for a desired theme or brand and choose from multiple, customizable content options. In this way, one can manage and schedule digital signage solutions across one or more locations using a single management device. Present operation and operation history of one or more media players can be monitored using the management device. The management device can be an application on a desktop computer, laptop computer, or smartphone, which can rapidly and remotely inquire as to the status of various media players linked over the internet, for example. Using the management device, one can ascertain media players and/or output devices that are currently in operation, that are offline, review performance metrics, recently played content, send on-click commands, export reports, and opt-in for alerts, including text messaging or email alerts.

Audio and visual digital media systems are provided that include a management device, a media player, and an output device. The management device is configured with a content database that includes identities of audio and visual content. The management device is configured to select amongst the identities of audio and visual content from the content database to provide audio and visual selections. The media player is configured for receiving from the management device the audio and visual selections, where the media player is further configured for retrieving data corresponding to the audio and visual selections. The output device is configured for outputting the retrieved data corresponding to the audio and visual selections. For example, the management device can be used to select amongst the identities of audio and visual content from the content database to provide audio and visual selections. The media player can then receive the audio and visual selections, similar to a playlist for example, where the media player then can retrieve data corresponding to the audio and visual selections. Retrieval of data corresponding to the audio and visual selections can include retrieving audio and visual content files from the management device and/or from other devices or services (e.g., on-demand streaming services, live programing, various content libraries, etc.).

In this way, various content databases can be constructed and the identities of various audio and visual content can be selected as desired. It is therefore possible to tailor audio and visual content provided to various output devices at various locations, where the output can be updated/modified simply by selecting amongst the identities of audio and visual content from the content database. For example, a restaurant owner can readily adapt the system to provide output related to certain events, menu items, advertisements, commercials, music, etc. One non-limiting example includes providing output to a screen including a stream of a live sporting event, where the same screen includes a portion showing food and drink specials, another portion shows a schedule of events for the week, and yet another portion shows what background music is playing, while audio of the live sporting event is also playing.

The management device can include the following aspects. In certain embodiments, the management device can be remote from the media player. By remote, it is meant that the management device can be transported and/or located at a different geographical location from the media player; e.g., the management device can be embodied on a laptop computer while several media players are positioned at various restaurants. The management device can include a first processing means, a first non-transient data storage means, and a first communication means. The first non-transient data storage means can include the content database. The first communication means can be configured for transmitting the audio and visual selections to the media player. The first communication means can be configured for transmitting via the internet. It is also possible to transmit via mobile phone towers or other local or regional wired or wireless communication systems.

The media player can include the following aspects. Embodiments of the media player can include a second processing means, a second non-transient data storage means, and a second communication means. The second communication means can be configured for receiving from the management device the audio and visual selections. The second non-transient data storage means can include the retrieved data corresponding to the audio and visual selections. The second non-transient data storage means can be used to buffer the retrieved data corresponding to the audio and visual selections. That is, only a portion of the retrieved data corresponding to the audio and visual selections may need to be stored on the media player. The second non-transient data storage means can also be used to store one of an audio content file and a visual content file of the retrieved data corresponding to the audio and visual selections. It is therefore possible to store data files corresponding to entire audio programs (e.g., entire songs, jingles, commercials, etc.) and/or to entire visual programs (e.g., movies, episodes, commercials, etc.).

Retrieving data corresponding to the audio and visual selections can include retrieving an audio content file stored on the management device and/or retrieving a visual content file stored on the management device. Retrieving data corresponding to the audio and visual selections can also include retrieving an audio content file stored on a device remote to the management device and/or retrieving a visual content file stored on a device remote to the management device. The device remote to the management device can include one of an on-demand streaming service and a live streaming service. Retrieving data corresponding to the audio and visual selections can therefore include retrieving an audio content file stored on the management device and/or retrieving a visual content file stored on the management device while also retrieving an audio content file stored on a device remote to the management device and/or retrieving a visual content file stored on a device remote to the management device.

Embodiments of the audio and visual digital media system can also include where the management device is configured to select amongst the identities of audio and visual content from the content database to provide a plurality of audio and visual selections. The system can comprise a plurality of media players and a plurality of output devices. Each media player can be configured for receiving from the management device one of the audio and visual selections while each media player can be configured for retrieving data corresponding to the one of the audio and visual selections. Each output device can be configured for outputting the retrieved data corresponding to the one of audio and visual selections from one of the media players. As such, the system can supply audio and visual content to multiple locations, each location having one or more media players associated with one or more output devices.

In certain embodiments, the media player can be configured with a reporting means. The reporting means can be configured for sending to the management device a number of times a particular audio content file or a particular visual content file from the audio and visual selections is output to the output device. The management device can therefore track and record statistics related to the audio and visual content.

The output device can include the following aspects. The output device can include a screen that is configured to simultaneously display a plurality of visual content from the audio and visual selections. The plurality of visual content can include various types of static and dynamic visual content, such as a menu, a schedule of events, a live video stream, live television, an on-demand program, a pre-recorded program, and/or an advertisement.

Systems provided herein can further include a feedback device that can be configured to send a signal to the management device and/or the media player. The signal can be operable to modify the audio and visual selections. For example, the signal can be a request to skip or change a particular audio and/or visual selection. In this way, the signal can be operable to skip the output of a particular audio content file or a particular visual content file from the audio and visual selections by the output device. The feedback device can include a remote control device, for example, for operating the media player and/or the output device. It is possible for the feedback device to signal the output device, which in turn signals the media player. The media player can also in turn signal the management device based upon the feedback device. The management device can also be configured to track and record the signals sent to the management device and/or the media player.

EXAMPLES

Example embodiments of the present technology are provided with reference to the several figures enclosed herewith.

With reference to FIGS. 1-10, an embodiment of an audio and visual digital media system and portions of the system shown.

FIG. 1 shows a schematic representation of an audio and visual digital media system according to the present technology. In the embodiment depicted, the management device is in the form of a software running on a laptop computer that can communicate over the internet with one or more media players. Each media player can be at a different location, room, environment, address, etc. Each media player can communicate, either wirelessly or wired, with an output device, where the output device is shown as a screen and a sound system.

Figure 2:
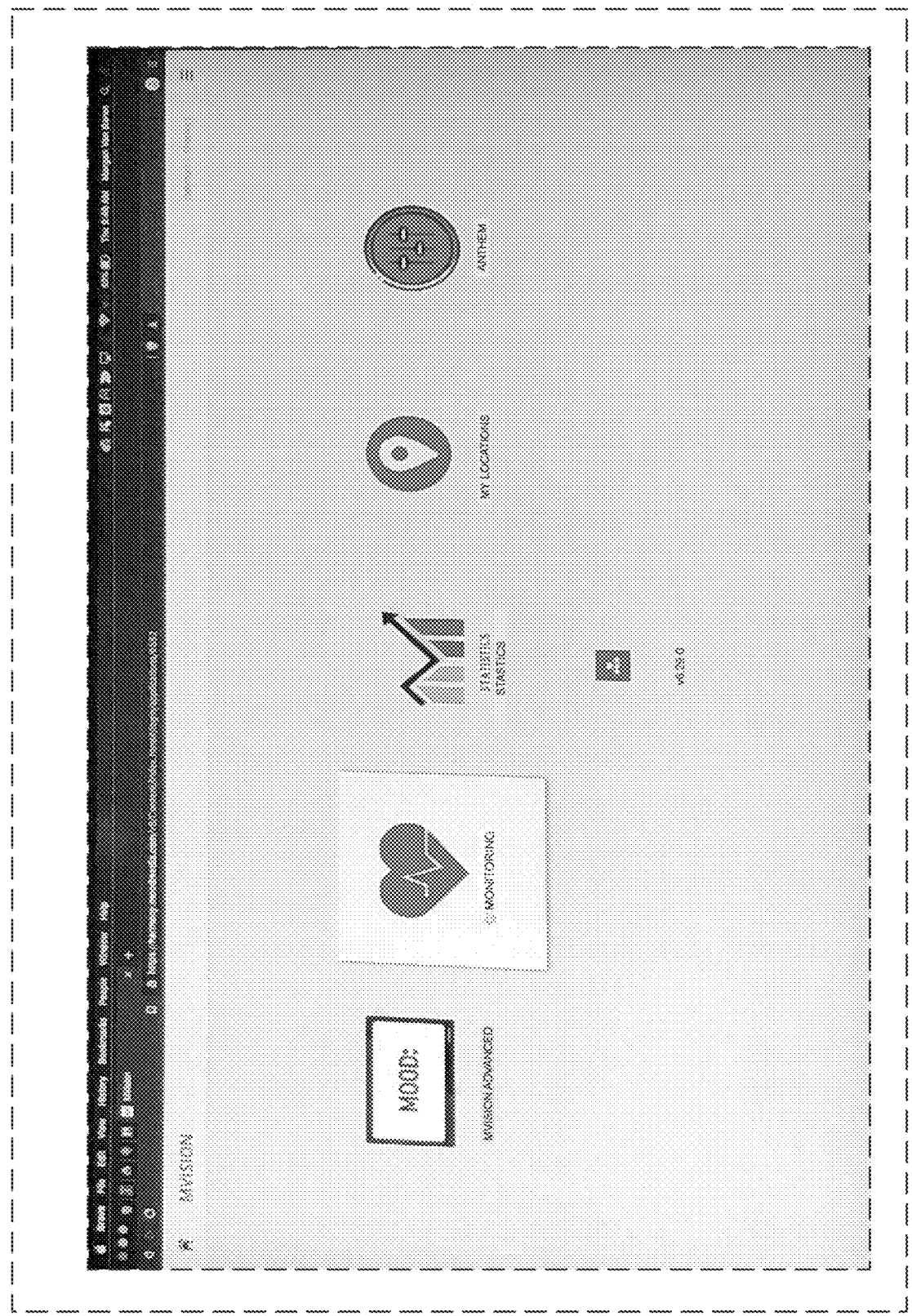
FIG. 2 shows a screenshot of an interface of a management device used in the the audio and visual digital media system.
Figure 3:
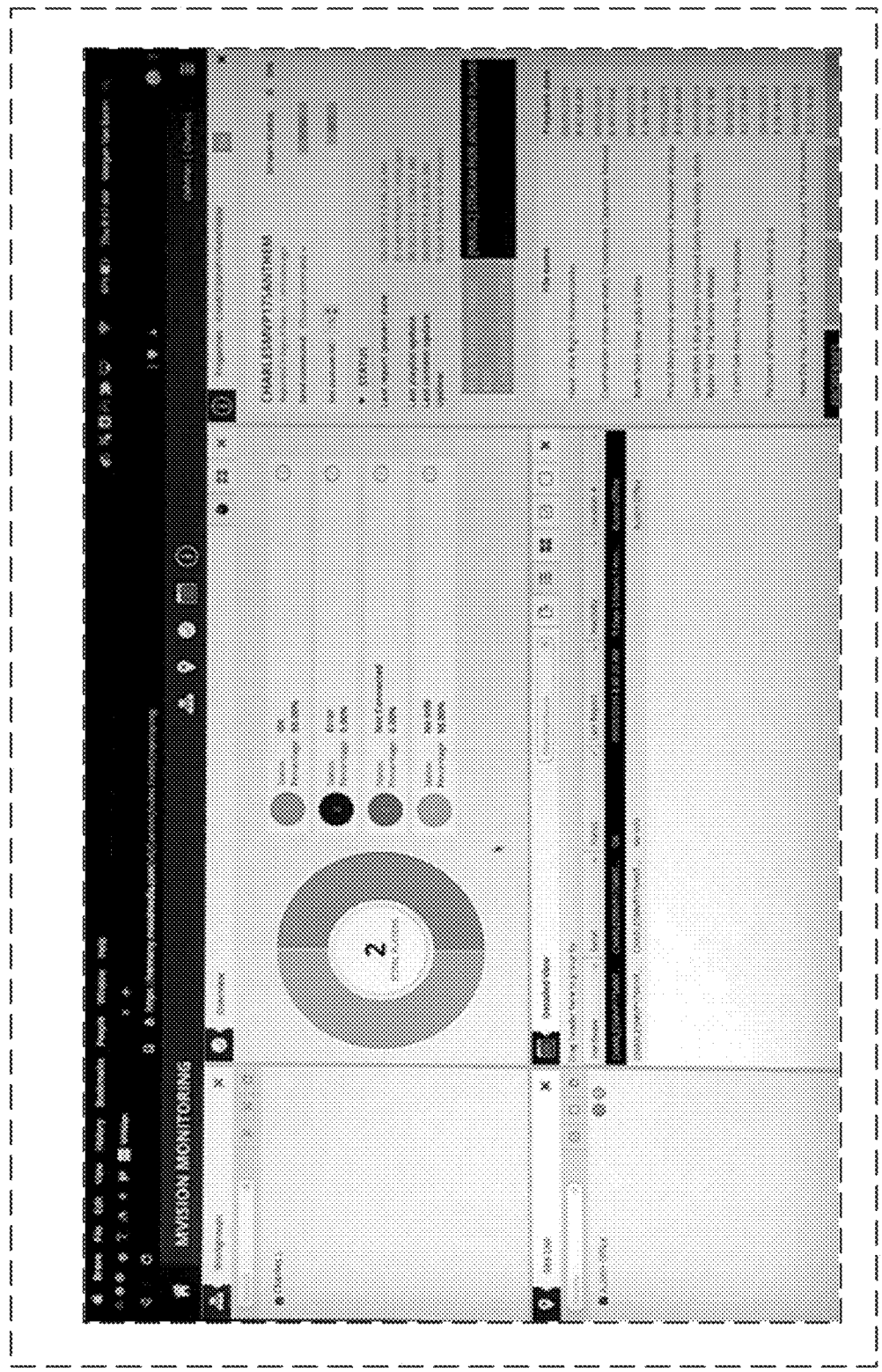
FIG. 3 shows another screenshot of an interface of a management device used in the audio and visual digital media system.
Figure 4:
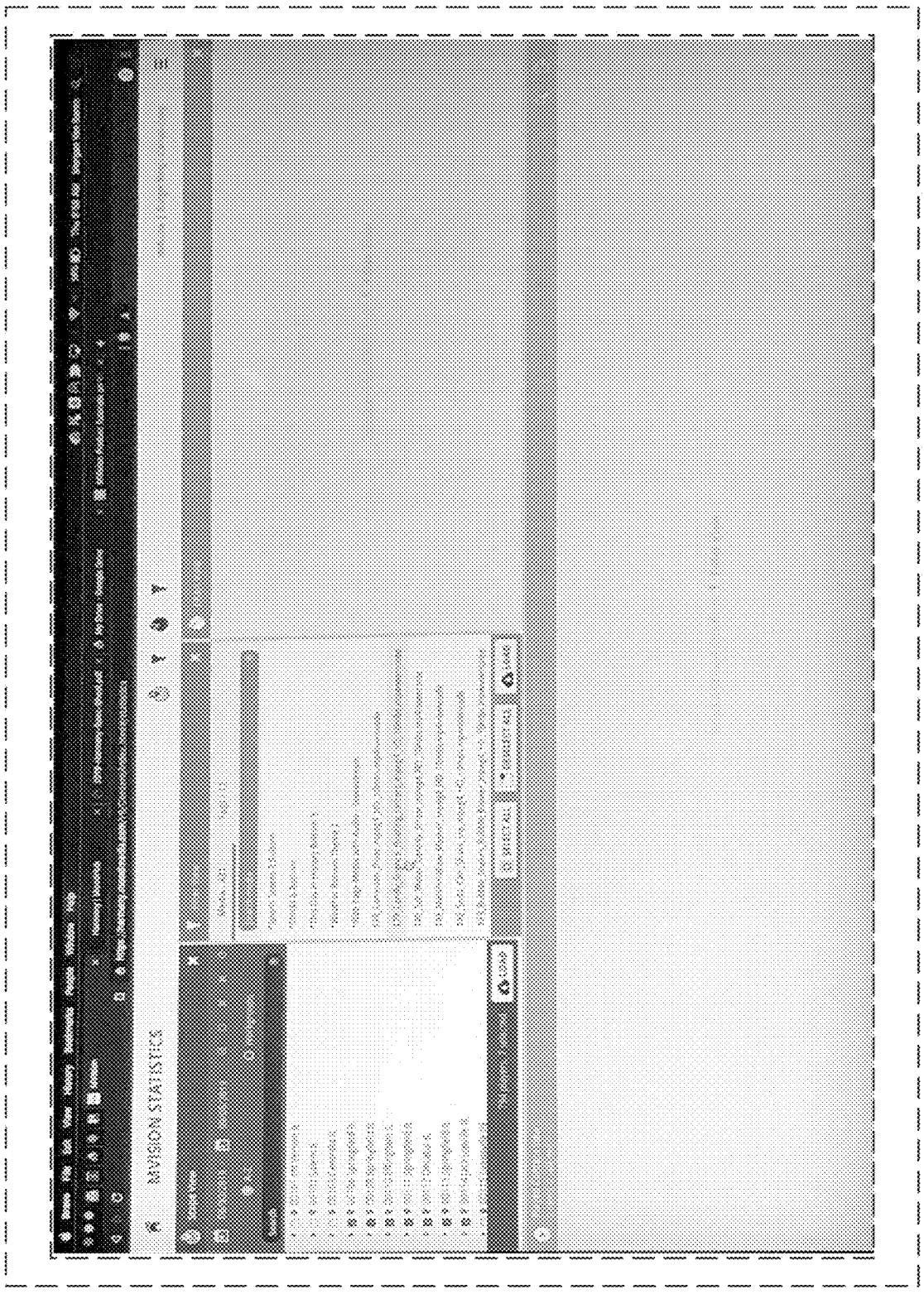
FIG. 4 shows yet another screenshot of an interface of a management device used in the audio and visual digital media system.
Figure 5:
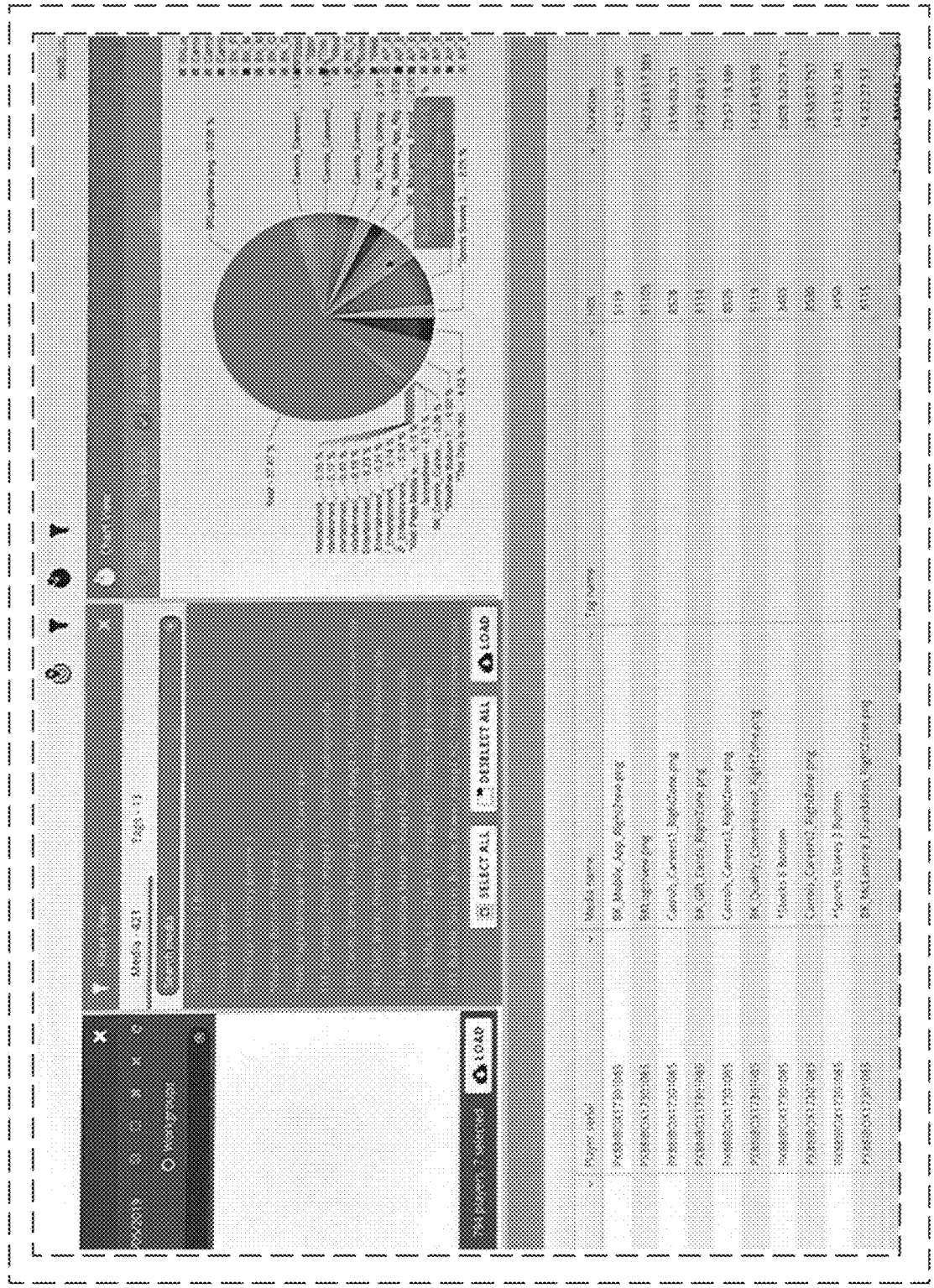
FIG. 5 shows still another screenshot of an interface of a management device used in the audio and visual digital media system.

FIGS. 2-5 show screenshots of an interface of a management device used in the the audio and visual digital media system. For example, FIG. 2 represents a simple interface, which can be icon based (e.g., application icon based on a mobile device touch screen) for controlling aspects of the management device, including forming and modifying one or more content databases, selecting amongst the identities of audio and visual content from the content database to provide audio and visual selections, and viewing statistics related to use and operation of the system. FIG. 3 shows various monitoring functions. FIG. 4 shows various statistics; e.g., number of times audio or visual content was played, likes/dislikes, skips, and various reporting signals received by the management device from feedback functionalities, etc. FIG. 5 shows multiple windows of database content, selections, statistics, and types of content (e.g., audio data file identities, visual data file identities).

Figure 6:
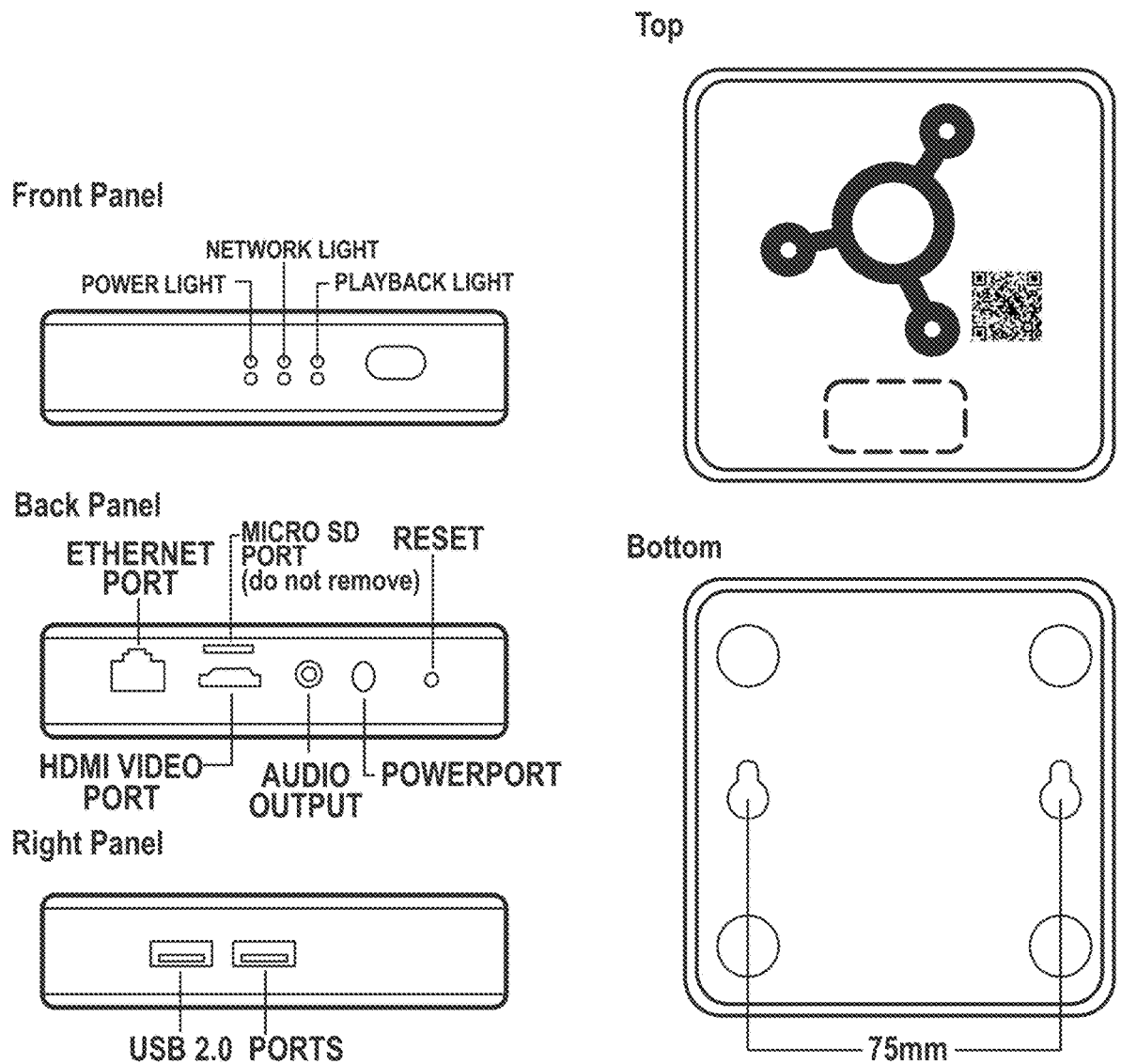
FIG. 6 shows several views of a media player used in the audio and visual digital media system.

FIG. 6 shows several views of a media player used in the audio and visual digital media system.

Figure 7:
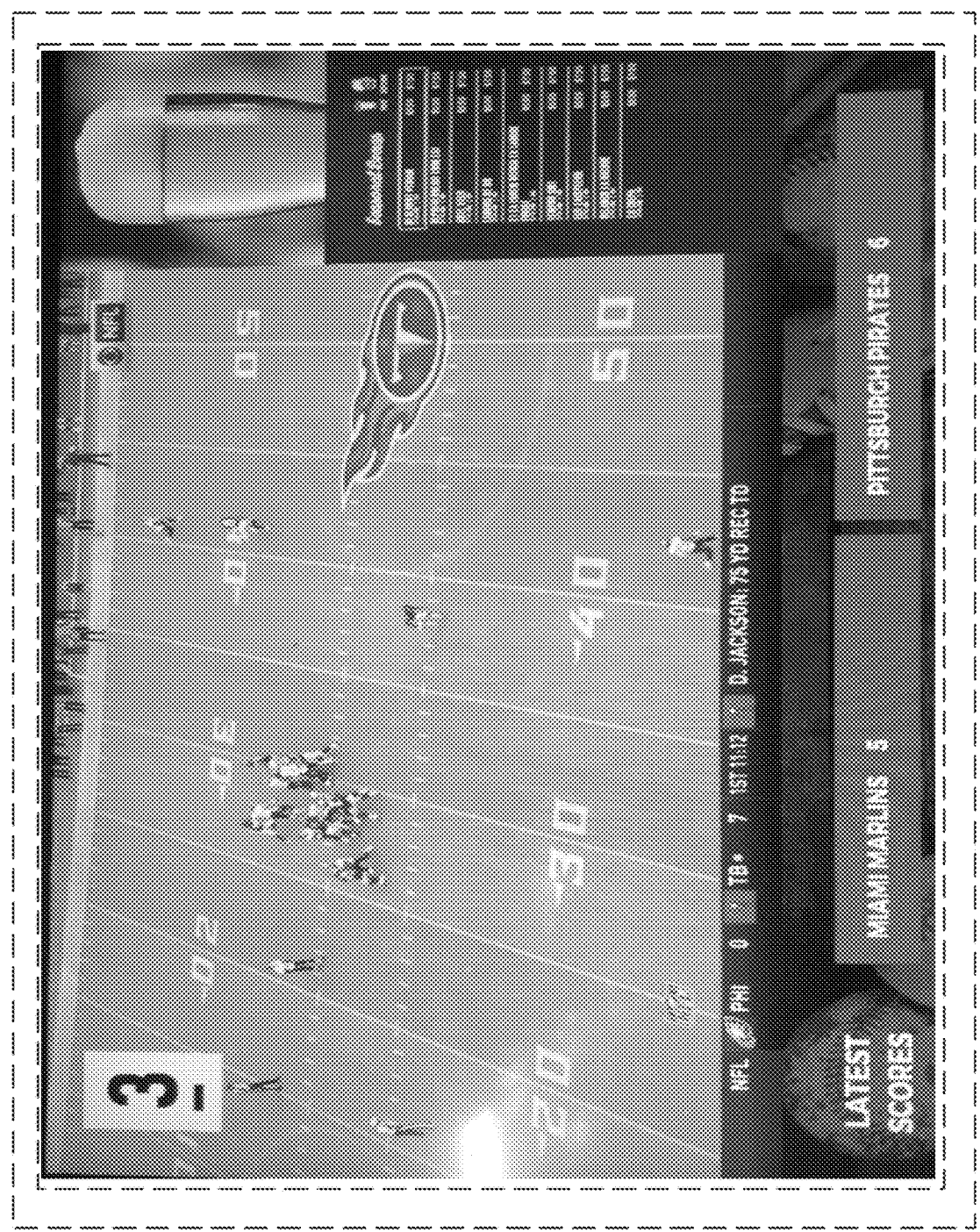
FIG. 7 shows a photograph of an output device used in the audio and visual digital media system.
Figure 8:
FIG. 8 shows another photograph of an output device used in the audio and visual digital media system.
Figure 9:
FIG. 9 shows yet another photograph of an output device used in the audio and visual digital media system.
Figure 10:
FIG. 10 shows still another photograph of an output device used in the audio and visual digital media system.

FIGS. 7-10 show photographs of various output devices used in the audio and visual digital media system. FIG. 7 shows a screen with a portion showing multiple visual selections, including a stream of a live sporting event, a portion showing a beverage menu, and a portion showing dynamically updating sports scores. FIG. 8 shows a screen displaying real-time beverage availability and pricing. FIG. 9 shows a screen with a menu portion, a beverage portion, and a graphics or advertisement portion. FIG. 10 shows an output device including multiple screens, where some of the screens simultaneously display multiple visual selections.

In various embodiments, one or more of the media system, the management device, the media player, and/or the output device transmit control signals to cause one or more of the other devices to perform actions those devices would not perform absent receipt of the control signals. For example, in one embodiment, the management device transmits control signals to the media player causing the media player to perform actions it would not perform but for the control signals.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

What is claimed is:

1. An audio and visual digital media system comprising:
a central management device controlled by a business having at least a first place of business and a second place of business that is geographically different and distinct from the first place of business, wherein the central management device comprises an audio and visual digital media application encoded on the central management device, and wherein the central management device is configured with a content database, the content database including identities of audio and visual content, the central management device is configured to select amongst the identities of audio and visual content from the content database to provide audio and visual selections comprising both:
(i) live or on demand content, wherein the live or on demand content
comprises a first audio and visual content, and
(ii) user-customized advertising or on-site information, wherein the user- customized advertising or on-site information comprises a second audio and visual content;
a first media player located at the first place of business having a first geographical location, wherein the first media player is geographically remote from the central management device and in communication therewith, and wherein the first media player is configured for receiving from the central management device the audio and visual selections, the first media player configured for retrieving first data corresponding to the audio and visual selections;
a first output device located at the first geographical location configured for outputting the retrieved first data corresponding to the audio and visual selections, wherein both the (i) first audio and visual content of the live or on-demand content and the (ii) second audio and visual content of the user-customized advertising or on-site information are outputted concurrently by the first output device; and
a second media player located at the second place of business having a second geographical location different than the first geographical location, wherein the second media player is geographically remote from the central management device and in communication therewith, and wherein the second media player is configured for receiving from the central management device the audio and visual selections, the second media player configured for retrieving second data corresponding to the audio and visual selections;

a second output device located at the second geographical location configured for outputting the retrieved second data corresponding to the audio and visual selections, wherein both the (i) first audio and visual content of the live or on-demand content and the (ii) second audio and visual content of the user-customized advertising or on-site information are outputted concurrently by the second output device.

2. The audio and visual digital media system of claim 1, wherein the central management device is remote from the first media player and the second media player.

3. The audio and visual digital media system of claim 1, wherein the central management device includes a first processing means, a first non- transient data storage means, and a first communication means, the first non-transient data storage means including the content database, the first communication means configured for transmitting to the first media player and the second media player the audio and visual selections.

4. The audio and visual digital media system of claim 3, wherein the communication means is configured for transmitting via the internet.

5. The audio and visual digital media system of claim 1, wherein the first media player includes a processing means, a non-transient data storage means, and a communication means, the communication means configured for receiving from the central management device the audio and visual selections, the non-transient data storage means including the retrieved first data corresponding to the audio and visual selections.

6. The audio and visual digital media system of claim 5, wherein the non-transient data storage means is used to buffer the retrieved first data corresponding to the audio and visual selections.

7. The audio and visual digital media system of claim 5, wherein the non-transient data storage means is used to store one of an audio content file and a visual
content file of the retrieved first data corresponding to the audio and visual selections.

8. The audio and visual digital media system of claim 1, wherein retrieving first data corresponding to the audio and visual selections comprises one or more of: retrieving an audio content file stored on the central management device or retrieving a visual content file stored on the central management device.

9. The audio and visual digital media system of claim 1, wherein retrieving first data corresponding to the audio and visual selections comprises one or more of: retrieving an audio content file stored on a device remote to the central management device or retrieving a visual content file stored on a device remote to the central management device.

10. The audio and visual digital media system of claim 9, wherein the device remote to the central management device includes one of an on- demand streaming service or a live streaming service.

11. The audio and visual digital media system of claim 1, wherein retrieving first data corresponding to the audio and visual selections includes:
one or more of: retrieving an audio content file stored on the central management device or retrieving a visual content file stored on the central management device, and
one or more of: retrieving an audio content file stored on a device remote to the central management device or retrieving a visual content file stored on a device remote to the central management device.

12. The audio and visual digital media system of claim 1, wherein:
the central management device is configured to select amongst the identities of audio and visual content from the content database to provide a plurality of audio and visual selections;
the audio and visual digital media system comprises a plurality of media players and a plurality of output devices;
each media player in the plurality of media players is configured for receiving from the central management device one of the audio and visual selections, and each media player in the plurality of media players is configured for retrieving data corresponding to the one of the audio and visual selections; and
each output device in the plurality of output devices is configured for outputting the retrieved data corresponding to the one of audio and visual selections from one of the media players in the plurality of media players.

13. The audio and visual digital media system of claim 1, wherein the first output device includes a screen, the screen configured to simultaneously display a plurality of visual content from the audio and visual selections.

14. The audio and visual digital media system of claim 13, wherein the plurality of visual content includes one or more of: a menu, a schedule of events, a live video stream, live television, an on-demand program, a prerecorded program, or an advertisement.

15. The audio and visual digital media system of claim 1, wherein the first media player is configured with a reporting means, the reporting means configured for sending to the central management device a number of times a particular audio content file or a particular visual content file from the audio and visual selections is output to the first output device.

16. The audio and visual digital media system of claim 1, further comprising a feedback device, the feedback device configured to send a signal to one or more of: the central management device or the first media player.

17. The audio and visual digital media system of claim 16, wherein the signal is operable to modify the audio and visual selections.

18. The audio and visual digital media system of claim 16, wherein the signal is operable to skip output of a particular audio content file or a particular visual content file from the audio and visual selections by the first output device.

19. The audio and visual digital media system of claim 16, wherein the feedback device comprises a remote control device for operating one of the first media player and the first output device.

20. The audio and visual digital media system of claim 16, wherein the central management device is configured to track and record the signal sent to the central management device or the first media player.

* * * * *

UNITED STATES PATENT AND TRADEMARK OFFICE
CERTIFICATE OF CORRECTION

| | |
|---|---|
| PATENT NO. | : 11,831,942 B2 |
| APPLICATION NO. | : 17/039457 |
| DATED | : November 28, 2023 |
| INVENTOR(S) | : Van Baren et al. |

It is certified that error appears in the above-identified patent and that said Letters Patent is hereby corrected as shown below:

In the Specification

In Column 2, Line 37, delete "the the" and insert -- the --, therefor.

In Column 7, Line 33, delete "the the" and insert -- the --, therefor.

In the Claims

In Column 8, Claim 1, Line 40, delete "user- customized" and insert -- user-customized --, therefor.

In Column 9, Claim 3, Line 16, after "a" delete "first".

In Column 9, Claim 3, Line 17, delete "first non- transient" and insert -- non-transient --, therefor.

In Column 9, Claim 3, Line 18, before "communication" delete "first".

In Column 9, Claim 3, Line 18, before "non-transient" and delete "first".

In Column 9, Claim 3, Line 19, after "database, the" delete "first".

In Column 9, Claim 10, Line 58, delete "on- demand" and insert -- on-demand --, therefor.

In Column 10, Claim 11, Line 3, delete "device," and insert -- device; --, therefor.

Signed and Sealed this
Twenty-third Day of January, 2024

Katherine Kelly Vidal
*Director of the United States Patent and Trademark Office*